United States Patent [19]

Arthur et al.

[11] Patent Number: 4,689,952
[45] Date of Patent: Sep. 1, 1987

[54] TUNED EXHAUST MANIFOLD

[75] Inventors: James C. Arthur; Freddie A. Baldwin, both of Columbus, Ind.

[73] Assignee: Arvin Industries, Inc., Columbus, Ind.

[21] Appl. No.: 873,984

[22] Filed: Jun. 13, 1986

[51] Int. Cl.⁴ .......................... F02B 27/02; F01N 7/10
[52] U.S. Cl. .................................. 60/313; 29/157 R; 29/428; 29/463; 60/323
[58] Field of Search ............... 60/313, 323; 29/157 R, 29/428, 463

[56] References Cited

U.S. PATENT DOCUMENTS

| | | | |
|---|---|---|---|
| 2,940,249 | 6/1960 | Gospodar | 60/313 |
| 3,488,944 | 1/1970 | Saletzki et al. | 60/13 |
| 3,543,509 | 12/1970 | Boerma | 60/323 |
| 3,703,083 | 11/1972 | Tadokoro | 60/322 |
| 3,722,221 | 3/1973 | Chopin et al. | 60/282 |
| 3,729,937 | 5/1973 | Haddad | 60/298 |
| 3,796,048 | 3/1974 | Annus et al. | 60/598 |
| 3,798,903 | 3/1974 | Mitchell et al. | 60/282 |
| 3,916,850 | 11/1975 | Date et al. | 123/52 |
| 3,940,927 | 3/1976 | Maurhoff et al. | 60/282 |
| 4,022,019 | 5/1977 | Garcea | 60/282 |
| 4,055,043 | 10/1977 | Konishi et al. | 60/282 |
| 4,215,093 | 7/1980 | Yasuda | 421/179 |
| 4,301,775 | 11/1981 | Smart et al. | 123/52 |
| 4,373,331 | 2/1983 | Santiago et al. | 60/323 |
| 4,537,027 | 8/1985 | Harwood | 60/323 |

FOREIGN PATENT DOCUMENTS 1286368  1/1962  France .
352912  1/1930  United Kingdom .................. 60/323

Primary Examiner—Douglas Hart
Attorney, Agent, or Firm—Barnes & Thornburg

[57] ABSTRACT

A tuned exhaust manifold is provided for attachment to an engine having a plurality of exhaust ports. The manifold includes an inner and outer shell joined together to form an exhaust chamber and an inwardly-opening flange-receiving space at a split line defined by the union of the inner and outer shells. Captive tuning baffles are dropped in place and positioned in the exhaust chamber to isolate individual engine exhaust ports for engine performance tuning. Each baffle includes a flange trapped in the space between the inner and outer shells to retain the baffle in a predetermined position within the exhaust chamber. The baffles are arranged in a predetermined pattern within the exhaust manifold to define separate passgeways extending from exhaust inlet openings formed in the inner shell toward one or more exhaust openings of the manifold. Tuning is accomplished by configuring and placing the baffles to control the flow of exhaust from each engine exhaust port through the exhaust manifold. A method of assembling the captive tuning baffles between the inner and outer shells is also provided.

27 Claims, 7 Drawing Figures

TUNED EXHAUST MANIFOLD

BACKGROUND AND SUMMARY OF THE INVENTION

This invention relates to an exhaust manifold for conducting exhaust gases from an engine block toward exhaust piping. In particular, this invention relates to an exhaust manifold having baffles arranged in a common space within the manifold to divide the space into a plurality of passageways thereby controlling the flow of exhaust gas through the manifold for engine performance tuning. More particularly, this invention relates to a tuned exhaust manifold of sheet metal construction having drop-in baffles.

Engine performance tuning is typically accomplished by means of an exhaust "header" type system. A conventional exhaust header comprises a plurality of individual elongated tubes for coupling each of the cylinder heads of an engine block to a remote manifold chamber or exhaust pipe. Adjacent exhaust ports in the engine block are "isolated" by the separate header tubes in order to tune engine performance. It is impractical to install header systems in many vehicles since these systems generally take up a significant amount of the small available space in the engine compartment. In addition, these header systems often require costly and complex welds and bends. See, for example, U.S. Pat. No. 4,373,331 to Santiago et al.

Conventional exhaust manifolds usually comprise heavy cast metal tanks coupled directly to the engine block in a position to receive engine exhaust gases. See, for example, U.S. Pat. No. 4,301,775 to Smart et al. The added weight provided by cast metal manifolds is known to affect fuel efficiency and hamper engine performance.

It is known to form an exhaust manifold using stamped sheet metal members. U.S. Pat. No. 4,537,027 to Harwood et al. discloses only an exhaust manifold of conventional configuration which has a housing formed of sheet metal construction.

U.S. Pat. No. 3,940,927 to Maurhoff et al. discloses a sheet metal shell containing a freely movable reactor chamber for afterburning engine exhaust gasses. The reacter chamber is freely movable within the shell in accordance with the thermal distortions of the reactor to minimize resulting stresses in the reactor. Maurhoff et al. does not address the problem of "tuning" an exhaust manifold.

U.S. Pat. No. 4,373,331 to Santiago et al. discloses a tubular manifold including two half-stampings welded together to form a plurality of separate exhaust tubes. A considerable amount of welding is necessary to join these two half-stampings together due to the tubular configuration of the Santiago et al. manifold. Also, the continuous webs interconnecting the exhaust tubes disclosed in Santiago et al. add additional weight to the manifold assembly. Although such a tubular design does permit "tuning" of the various runners, it does not provide the compactness required for many crowded underhood conditions.

One object of the present invention is to provide an exhaust manifold which eliminates complex welding and bending of tubes yet is configured to permit engine performance tuning.

Another object of the present invention is to provide a compact tuned exhaust manifold which is light weight, rigid, and easy to manufacture.

Yet another object of the present invention is to provide a stamped split exhaust manifold housing with drop-in baffles to divide a common space in the housing into a plurality of separate exhaust gas passageways configured to performance-tune the exhaust manifold.

Still another object of the present invention is to provide a method of assembling a tuned exhaust manifold which is simple and requires a minimum number of welded joints.

In accordance with the present invention, an improved exhaust manifold is provided for attachment to an engine having a plurality of exhaust ports and is configured to permit performance tuning of the engine. The manifold includes a housing formed to include an exhaust chamber and baffle means in the exhaust chamber for partitioning the exhaust chamber into a plurality of separate passageways to performance-tune the exhaust manifold.

The housing is formed to include inlet means for admitting combustion product discharged from the engine exhaust ports into the exhaust chamber and outlet means for exhausting combustion product from the exhaust chamber. The baffle means is fixed in a predetermined position to define separate passageways connecting each of the engine exhaust ports to the outlet means. The baffle means acts to isolate the flow of combustion product discharged into the exhaust chamber from each engine exhaust port substantially into a companion passageway as it is conducted through the housing.

In preferred embodiments of the present invention, the housing includes a stamp-formed sheet metal inner shell providing the inlet means and a stamp-formed sheet metal outer shell attached to the inner shell at a perimetrically-extending split line. The inner and outer shells cooperate to define a flange-receiving space therebetween at the split line which opens into the interior of the housing. In addition, the inner and outer shells are each configured to define interior regions which cooperate to provide the exhaust chamber when the inner and outer shells are joined together. At least one of the inner and outer shells can include dimple means for aligning the baffle means in a predetermined pattern within the housing during assembly of the exhaust manifold.

The baffle means includes a plurality of stamped sheet metal tuning baffles situated in predetermined positions within the exhaust manifold. The baffles are arranged to divide the exhaust chamber into a plurality of separate combustion product-conducting passageways. Each passageway distributes combustion product from one of the inlet openings formed in the inner shell to the outlet means and effectively isolates individual engine exhaust ports for engine performance tuning.

Each tuning baffle includes a flange means and an integral tongue portion. The flange means is inserted into the flange-receiving space to attach the baffle to the exhaust manifold at the split line. In that manner, each baffle is dropped into the housing and retained at its predetermined position within the exhaust chamber. The tongue section is canted at a predetermined angle relative to the flange means. The tongue section of a mounted baffle extends into the interior region of the inner shell so that a distal end of the tongue section is positioned in close proximity to a selected inlet opening in the inner shell. The shape of the tuning baffles and the predetermined angles between the tongue sections and the flange means are selected in accordance with a predetermined specification to performance-tune the engine.

Also in accordance with the present invention, an improved method is provided of assembling a split-housing exhaust manifold having a plurality of tuning baffles disposed therein. Illustratively, the method includes the steps of providing an inner shell formed to include a plurality of inlet openings for communicating with exhaust ports of an engine and a perimetrical lip defining an opening, placing a portion of each tuning baffle on the perimetrical lip, positioning each tuning baffle in a predetermined location, inserting an outer shell into the opening defined by the perimetrical lip of the inner shell, and bonding the outer shell to the inner shell at a split line between the inner and outer shells to secure each tuning baffle rigidly in its predetermined position. Using this novel technique, each tuning baffle is positioned in a predetermined location in a common space in the exhaust manifold to isolate each exhaust port of the engine in its own passageway within the manifold so that the engine is performance-tuned.

In preferred embodiments of the present invention, the inner shell includes an interior wall having a plurality of groups of inwardly-extending dimples. Preferably, the method further comprises the step of moving each tuning baffle on the perimetrical lip to engage a selected group of inwardly-extending dimples. Thus, the dimples operate to provide means for aligning the baffles in the predetermined positions within the exhaust chamber during assembly of the exhaust manifold.

One feature of the present invention is the provision of tuning baffles in the interior of a compact exhaust manifold suitable for direct attachment to an engine block or head. This feature advantageously conserves underhood space in marked contrast to known exhaust headers or other tuned exhaust manifolds. The tuning baffles act to divide the interior of the exhaust manifold into a plurality of separate passageways. Such division of a common space in the manifold effectively isolates the incoming flow of combustion product discharged into the manifold by each engine exhaust port. Such flow isolation advantageously reduces intermixing in the exhaust manifold of combustion product discharged by the individual exhaust ports in the engine block or head and controls the back pressure at each inlet opening in the inner shell and the corresponding engine exhaust port.

Another feature of the present invention is the provision of tuning baffles having flange means for mounting in an inwardly-opening perimetrical space defined by the inner and outer shells at the split line of the housing. In the tuned exhaust manifold of the present invention, the inner and outer shells which cooperate to provide the manifold housing are configured to form the split line and the inwardly-opening, flange-receiving space at a location approximately midway between the manifold inlet mounting flanges and the portion of the mounted exhaust manifold that is the greatest distance away from the engine block. This novel split-line location permits tuning baffles of a wide variety of shapes, contours, and sizes to be captured or trapped in the flange-receiving space in the housing to divide the interior exhaust chamber into the separate flow-isolating passageways. Thus, the improved exhaust manifold of the present invention can be tuned in accordance with virtually any design specification by varying the shape of the tuning baffles and the arrangement of the baffles within the exhaust chamber while always securing the baffles in a predetermined position via a rigid attachment to the housing at the split line.

Moreover, the foregoing features advantageously simplify the manufacturability of a tuned exhaust manifold by replacing the complex welds and pipe bends of conventional tubular tuned exhaust systems with the novel trapped baffle assembly of the present invention. Thus, the tuning baffles may be stamp-formed of sheet metal, thereby eliminating the need to perform complex, costly, and time-consuming welding procedures on conventional irregular, elongated pipe bends. These novel stamped tuning baffles are especially well-suited for use in combination with stamp-formed sheet metal housing shells when assembled using the novel method of the present invention.

Additional objects, features, and advantages of the invention will become apparent to those skilled in the art on consideration of the following detailed description of preferred embodiments exemplifying the best mode of carrying out the invention as presently perceived.

BRIEF DESCRIPTION OF THE DRAWINGS

The detailed description particularly refers to accompanying figures in which.

DETAILED DESCRIPTION OF THE DRAWINGS

Figure 1:
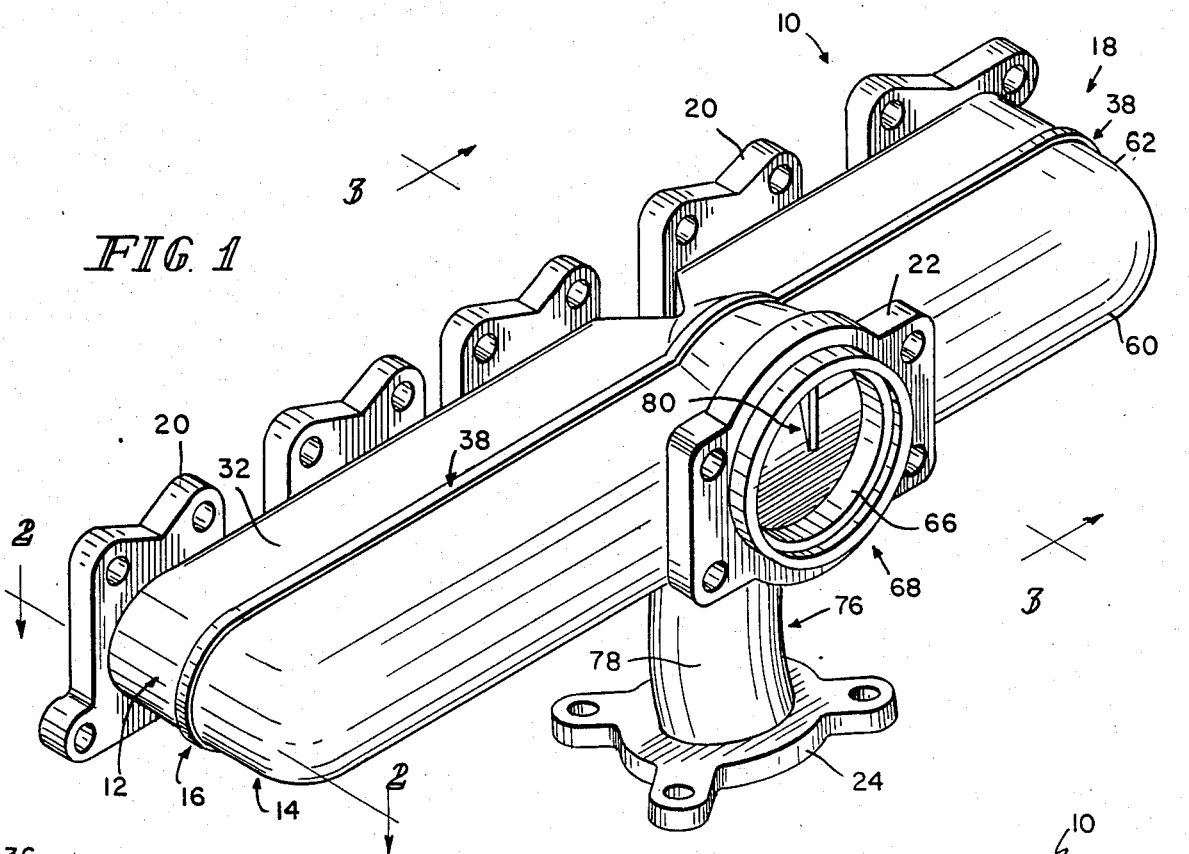
FIG. 1 is a perspective view of a preferred embodiment of the improved tuned exhaust manifold of the present invention.
Figure 2:
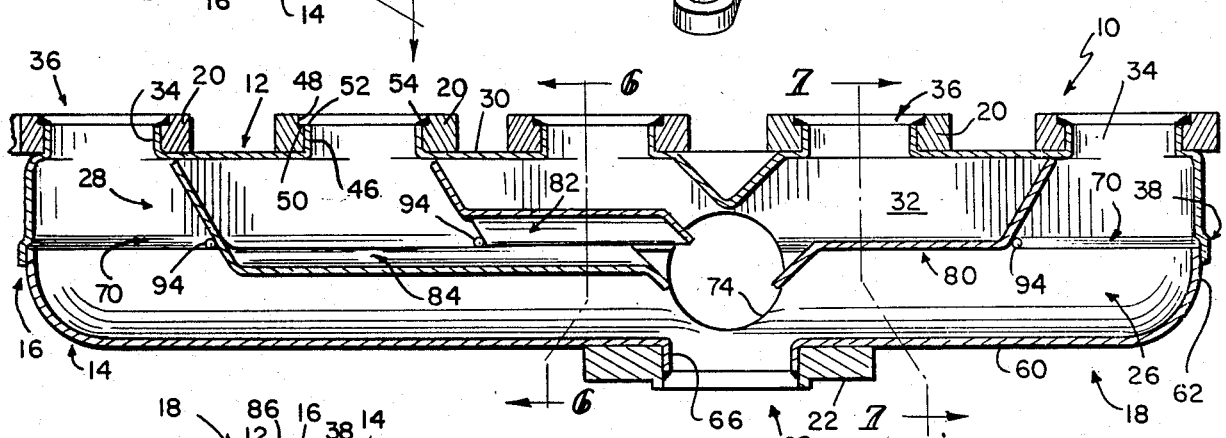
FIG. 2 is a sectional view taken generally along lines 2—2 of FIG. 1 showing tuning baffles arranged in a common space formed in the exhaust manifold illustrated in FIG. 1 to provide a plurality of separate passageways coupling the inlet and outlet means.

The exhaust manifold 10 illustrated in FIGS. 1 and 2 includes an inner shell 12 joined to an outer shell 14 at a split line 16 to provide a housing 18. Inlet flanges 20 are provided to connect the housing 18 to an engine block or head (not shown) by means of fasteners (not shown). Outlet flanges 22, 24 are provided to connect the housing 18 to a remaining portion (not shown) of an engine exhaust system (e.g. exhaust piping, turbocharger, etc. . . ) also by means of fasteners (not shown). The housing 18 is formed to include an interior exhaust chamber 26 as shown best in FIG. 2.

Figure 5:
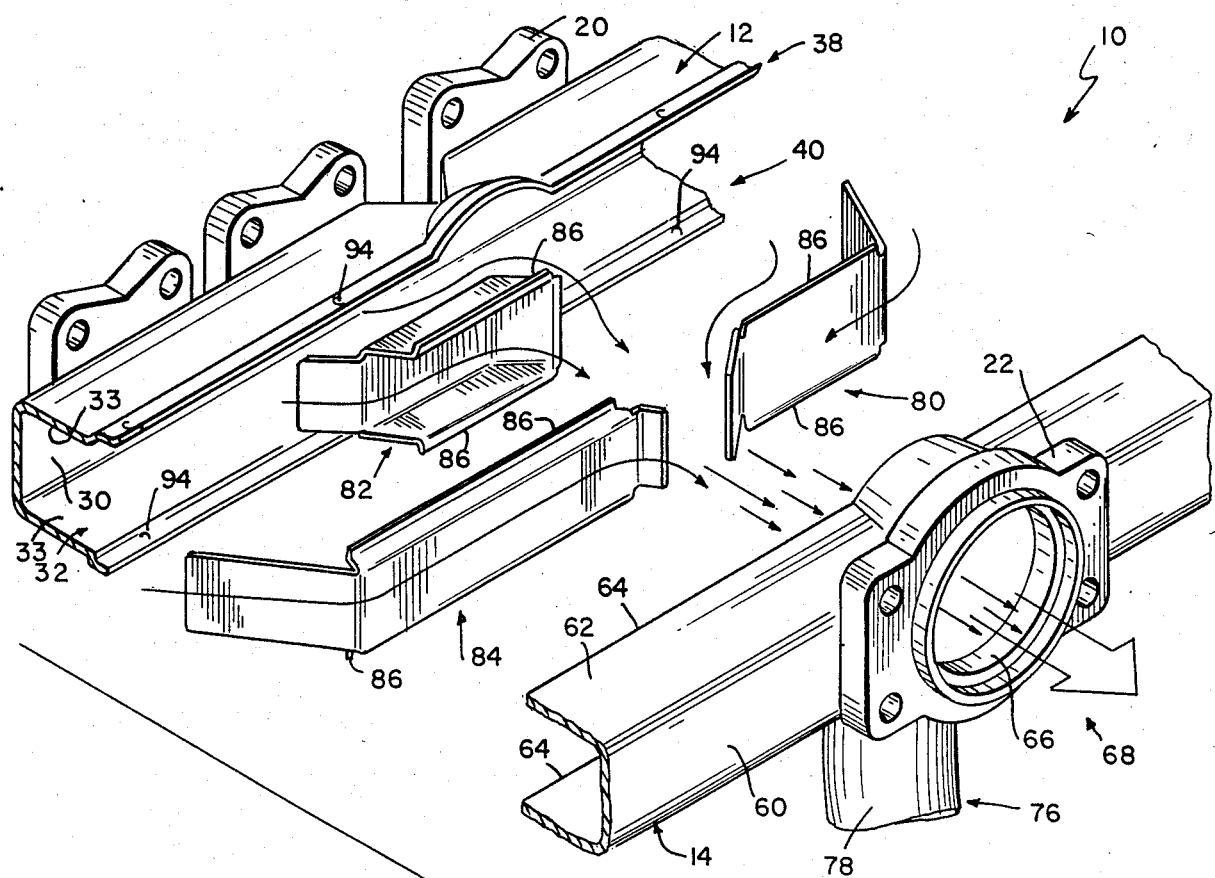
FIG. 5 is an exploded isometric view of the tuned exhaust manifold of the present invention with portions broken away showing three tuning baffles of various shapes and sizes.

The inner shell 12 is shaped to define an interior region 28 forming approximately one-half of the exhaust chamber 26 and includes a bottom wall 30 and a continuous peripheral wall 32 having opposite side portions 33. The bottom wall 30 includes a plurality of outwardly-extending inlet fixtures 34 which define inlet openings 36 for admitting exhaust gases from the engine into the exhaust chamber 26. As shown best in FIGS. 2 and 5, the peripheral wall 32 includes a perimetrical lip 38 defining an opening 40 for receiving the outer shell 14 during assembly of the exhaust manifold 10. The perimetrical lip 38 is spaced apart from the bottom wall 30 and includes a proximal beveled region 42 and a distal rim or side wall 44 which surrounds the opening 40.

In the illustrated embodiment, a separate inlet flange 20 is provided for connecting each inlet fixture 34 to the engine block or head so that the inlet openings 36 are in alignment with the engine exhaust ports of the engine block. Separate mounting flanges act to increase the strength and rigidity of the manifold structure. However, it is within the scope of the present invention to provide a unitary flange plate for joining the inlet fixtures 34 to the engine block or head.

The configuration of the separate inlet flanges 20 advantageously acts to reduce the need for complex welding and joining techniques as well as to eliminate secondary grinding or cleaning operations. Referring to FIGS. 2, 3, 6, and 7, it will be appreciated that each inlet fixture 34 fits closely within a first aperture 46 formed in a companion inlet flange 20 and extends less than the full distance through the first aperture 46. As seen best in FIG. 2, each inlet fixture 20 is also formed to include an axially outer second aperture 48 aligned in concentric relation to the axially inner first aperture 46 to provide a radially outwardly-extending, weld-receiving shelf 50 on the engine side of the inlet fixture 20.

The inlet fixture 34 is inserted into the first aperture 46 of the inlet flange 20 to align the distal end 52 of the inlet fixture with the radially outwardly-extending shelf 50 in substantially abutting coplanar relation. Weldment 54 is deposited onto shelf 50 and end 52 in the rim area of the second aperture 48 to join each inlet flange 20 to its companion inlet fixture 34. The welding technique necessary to deposit weldment 54 is both simple and fast.

The outer shell 14 is shaped to define an interior region forming approximately one-half of the exhaust chamber 26 and includes a top wall 60 and a continuous side wall 62 terminating at an axially inwardly-facing edge 64. The top wall 60 includes a first axially outwardly-extending outlet fixture 66 which defines first exhaust opening 68 for exhausting combustion product from the exhaust chamber 26. As shown best in FIGS. 2 and 3, the configuration of top outlet flange 22 is similar to that of the inlet flanges 20 to permit assembly of the top outlet flange 22 onto the first outlet fixture 66.

The continuous side wall 62 of the outer shell 14 is insertable into the opening 40 defined by the perimetrical lip 38 of the inner shell 12 during assembly of the exhaust manifold 10. Edge 64 of the outer shell is positioned in spaced-apart relation to the beveled region 48 of the inner shell 12 to define a flange-receiving space 70 best seen in FIGS. 2, 3, 6, and 7. The purpose of this space 70 is to provide means for capturing and retaining tuning baffles in predetermined performance-tuning positions within the common space provided by exhaust chamber 26.

Figure 3:
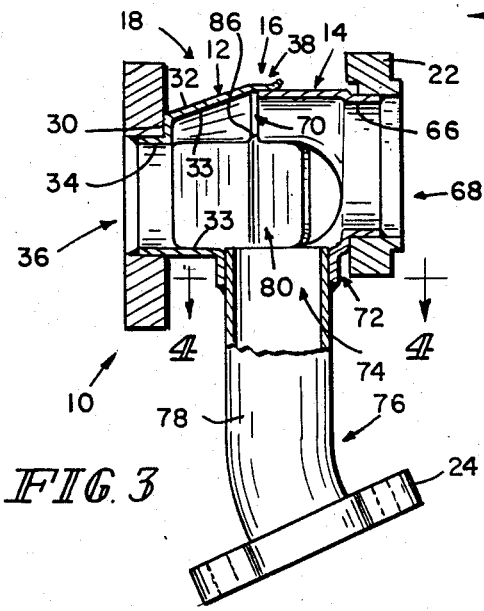
FIG. 3 is a transverse sectional view taken generally along lines 3—3 of FIG. 1.
Figure 4:
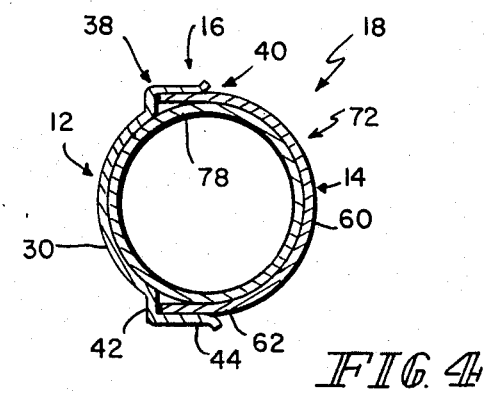
FIG. 4 is an enlarged dead section taken along lines 4—4 of FIG. 3.

A second outlet fixture 72 is formed to define a second exhaust opening 74 provided at the split line 16 as shown in FIGS. 2 and 3. Each of the inner and outer shells 12, 14 is configured to define a portion of the second exhaust opening 74 in the illustrated manner. An auxiliary exhaust assembly 76 includes side outlet flange 24 and is mounted in the second outlet fixture 72. The auxiliary exhaust assembly 76 conducts exhaust gas from the exhaust chamber 26 to a point of use outside of housing 18 such as exhaust piping, a turbocharger assembly, a turbo-boost waste-gate relief valve, or another component of an engine exhaust system.

Figures 6, 7:
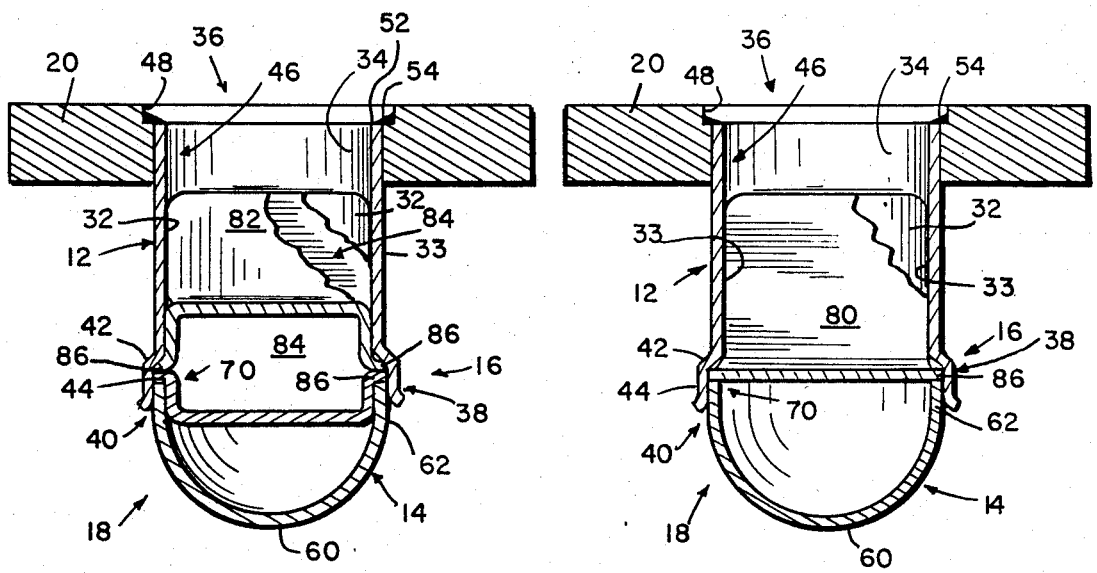
FIG. 6 is an enlarged sectional view taken generally along lines 6—6 of FIG. 2 with portions broken away.
FIG. 7 is an enlarged sectional view taken generally along lines 7—7 of FIG. 2 with portions broken away.

A plurality of baffles 80, 82, and 84 are dropped in place and arranged in predetermined positions within the housing 18 as shown best in FIGS. 2, 6, and 7. These baffles partition the exhaust chamber 26 into a plurality of separate passageways for conducting exhaust gas through the exhaust manifold 10. Each baffle 80, 82, and 84 includes at least one mounting flange 86 for insertion into the space 70 defined between the inner and outer shells 12, 14. The mounting flanges 86 permit each baffle to be captured or trapped in its predetermined position during assembly of the exhaust manifold without welding the baffle itself.

In the illustrated embodiment, each baffle 80, 82, and 84 includes an elongated center portion 88 providing a pair of oppositely-extending mounting flanges 86, an integral tongue section 90 canted at a predetermined angle in relation to the elongated center portion 88, and an integral angled outlet section 92. Inwardly-extending dimples 94 are formed in selected locations in inner shell 12 to provide stops on the housing 18 for positioning each baffle in a predetermined position.

The baffles 80, 82, and 84 are configured in the illustrated manner to aid in defining separate passageways for connecting each of the inlet openings 36 to the first and second exhaust openings 68, 74. Although the illustrated exhaust manifold 10 is configured for use with a five-cylinder engine, it will be appreciated that the unique baffle assembly of the present invention can be adapted for use with engines having various other cylinder arrangements. The minimum number of baffles required to divide the exhaust chamber into a sufficient number of separate flow-isolating passageways is two less than the number of inlet openings 36.

In the illustrated embodiment, each of the baffles 80, 82, and 84 is attached to housing 18 at the split line 16 and arranged in the illustrated pattern to define five substantially independent passageways. Each passageway connects one of the inlet openings 36 to both of the first and second exhaust openings 68, 76. It will be appreciated that each baffle could be configured in a variety of different ways to tune the exhaust manifold according to a predetermined specification and still be coupled to the housing 18 at about the split line 16 without departing from the scope of the present invention.

In the illustrated embodiment, the inner and outer shells 12, 14 are shaped to form the split line 16 and the flange-receiving space 70 in a location approximately midway between the bottom wall 30 of the inner shell 12 and the top wall 60 of the outer shell 14. Such positioning permits tuning baffles provided in the exhaust chamber to be configured in countless shapes to alter the pattern of combustion product flow through the housing 18 yet secured in position at a common split line. This feature offers greater strength and more flexibility for tuning engine performance than conventional tuned exhaust manifolds.

Three examples of suitable baffle shapes are illustrated in FIGS. 2 and 5–7. The baffles are sized to extend across the width of the common space 26 in the manifold housing 18 to divide that space 26 into separate passageways. Baffle 80 has a substantially flat center portion, while the center portion of baffle 82 is offset in a direction toward the inlet openings 36 to provide a flow channel having axially inwardly-extending side walls and the center portion of baffle 84 is offset in an opposite direction away from the inlet openings 36 to provide a flow channel having axially outwardly-extending side walls. Thus, the shape of the baffles can be varied to control the volume and cross-sectional area of the combustion product-conducting passageways while still securing all of the baffles to the housing 18 along the common split line 16.

The exhaust manifold 10 is assembled in the following manner. Inlet flanges 20 are fixtured and inner shell 12 is located and welded to flanges 20 to form a first subassembly. Side outlet flange 24 is fixtured and the outlet tube 78 of the auxiliary exhaust assembly 76 is located and welded to flange 24 to form a second sub-assembly. The baffles 80, 82, 84 are then positioned in the first sub-assembly using alignment dimples 94. The second sub-assembly 76 is then fixtured in its proper position abutting the first sub-assembly. The outer shell 14 is positioned over the first and second sub-assemblies, inserted into the perimetrical lip 38 of the inner shell 12, and clamped under load. The clamped inner shell 12, outer shell 14, and auxiliary exhaust assembly 76 are welded together to form a third sub-assembly. Top outlet flange 22 is fixtured and welded to the third sub-assembly in the illustrated orientation to complete the assembly of tuned exhaust manifold 10.

Although the invention has been described in detail with reference to certain preferred embodiments, variations and modifications exist within the scope and spirit of the invention as described and defined in the following claims.

What is claimed is:

1. An exhaust manifold for attachment to an engine having a plurality of exhaust ports, the exhaust manifold comprising
a housing formed to include an exhaust chamber, inlet means for admitting combustion product discharged from the engine exhaust ports into the exhaust chamber, and outlet means for exhausting combustion product from the exhaust chamber, the housing including an inner shell providing the inlet means and an outer shell attached to the inner shell at a perimetrically extending split line, the inner and outer shell cooperating to define the exhaust chamber therebetween, and
baffle means rigidly fixed in the exhaust chamber for partitioning the exhaust chamber to define separate passageways connecting each of the engine exhaust ports to the outlet means so that the flow of combustion product discharged from each engine exhaust port and admitted into the exhaust chamber is substantially isolated in its companion passageway as it is conducted through the housing to permit performance tuning of the exhaust manifold, the baffle means including at least one baffle rigidly attached to the housing at the split line.

2. The exhaust manifold of claim 1, wherein the baffle means includes a plurality of separate stamp formed sheet metal baffles extending from the inlet means to the outlet means.

3. The exhaust manifold of claim 1, wherein the at least one baffle and at least one of the inner and outer shells cooperate to define a combustion product-conducting passageway therebetween.

4. The exhaust manifold of claim 1, wherein the at least one baffle includes a forward portion, a rearward portion, and a pair of spaced-apart side portions extending therebetween, the forward and rearward portions are angled in relation to the side portions, and the spaced-apart side portions are attached to the housing at the split line so that the forward and rearward portions extend away from the split line.

5. The exhaust manifold of claim 4, wherein the inner and outer shells cooperate to define a flange-receiving space therebetween at the split line, and each baffle includes at least one mounting flange trapped in the flange-receiving space so that each baffle is retained in a predetermined position within the exhaust chamber.

6. The exhaust manifold of claim 4, wherein the at least one baffle includes an elongated center portion extending along the split line, an inlet portion extending from the center portion toward the inlet means provided by the inner shell, and an outlet portion extending from the center portion toward the outlet means.

7. The exhaust manifold of claim 4, wherein the inner and outer shells are stamp formed of sheet metal and the baffle means includes a plurality of separate stamp formed sheet metal baffles.

8. The exhaust manifold of claim 1, wherein the outlet means includes separate first and second outlet openings, the inner and outer shells are configured to provide the first outlet opening along the split line, and the outer shell is formed to provide the second outlet opening.

9. An exhaust manifold for attachment to an engine having a plurality of exhaust ports, the exhaust manifold comprising
an inner shell formed to include a plurality of inlet openings for receiving combustion product discharged from the engine exhaust ports,
an outer shell attached to the inner shell to define a split line extending about the perimeter of the exhaust manifold, the inner and outer shells cooperating to form an exhaust chamber therebetween,
outlet means for exhausting combustion product from the exhaust chamber, and
baffle means for dividing the exhaust chamber into separate passageways so that the flow of combustion product admitted into the exhaust manifold is directed in a predetermined pattern toward the outlet means to permit performance tuning of the exhaust manifold, the baffle means being rigidly fixed to the inner and outer shells to lie within the exhaust chamber.

10. The exhaust manifold of claim 9, wherein the inner shell is configured to define an interior region for receiving a portion of the baffle means.

11. The exhaust manifold of claim 9, wherein the inner shell has an interior wall configured to define a first interior region and the outer shell has an interior wall configured to define a second interior region having a volume substantially equivalent to the volume of the first interior region, the first and second interior regions cooperate to provide the exhaust chamber, and the baffle means includes at least one baffle trapped between the inner and outer shells in a predetermined position so that the inner and outer shells and at least one baffle cooperate to define a combustion product conducting passageway therebetween.

12. The exhaust manifold of claim 9, wherein the outlet means includes separate first and second outlet openings, the inner and outer shells cooperate to provide the first outlet opening along the split line, and the outer shell is formed to provide the second outlet opening.

13. The exhaust manifold of claim 9, wherein the outer shell includes a perimetrical edge and the inner shell includes a bottom wall formed to include the inlet openings and a spaced apart perimetrical lip defining an opening for receiving the perimetrical edge of the outer shell.

14. The exhaust manifold of claim 9, wherein the baffle means includes a plurality of baffles arranged in predetermined fixed positions within the exhaust manifold to divide the exhaust chamber into a plurality of separate passageways for distributing combustion product from each of the inlet openings to the outlet means effectively to isolate individual engine exhaust ports for engine performance tuning.

15. The exhaust manifold of claim 14, wherein each shell includes a pair of elongated opposing side walls and each baffle is positioned to extend between the side walls to bridge the space defined therebetween.

16. The exhaust manifold of claim 14, wherein each baffle is attached to the exhaust manifold at the split line.

17. The exhaust manifold of claim 14, wherein each of the inner shell, the outer shell, and the baffles is stamp formed of sheet metal.

18. The exhaust manifold of claim 14, wherein the inner and outer shells cooperate to define a flange-receiving space therebetween at the split line and each baffle includes at least one mounting flange trapped in the flange-receiving space to retain each baffle at its predetermined fixed position within the exhaust chamber.

19. The exhaust manifold of claim 14, wherein the inner and outer shells cooperate to define spaced-apart elongated side walls extending along the length of the manifold, each baffle includes a first portion having a flange attached to the exhaust manifold at the split line and an integral second portion canted at a predetermined angle to the first portion, the first portion bridges the space between the spaced-apart side walls, and the second portion extends into the inner shell and has a distal end positioned in close proximity to a selected inlet opening.

20. The exhaust manifold of claim 14, wherein the inner shell is formed to include (n) inlet openings, the quantity (n) being greater than or equal to three, and (n-2) baffles are arranged in a predetermined position within the exhaust chamber, the (n-2) baffles cooperating with the inner and outer shells to define (n) passageways arranged to couple each of the (n) inlet openings to the outlet means in fluid communication.

21. The exhaust manifold of claim 14, wherein at least one of the inner and outer shells includes dimple means for aligning the baffles in said predetermined positions within the exhaust chamber during assembly of the exhaust manifold.

22. A split-housing exhaust manifold for attachment to an engine having a plurality of exhaust ports, the exhaust manifold comprising
a stamped sheet metal base forming an inner exhaust chamber and including a bottom member having a plurality of inlet members defining inlet openings for communicating with the engine exhaust ports, a perimetrical lip positioned in spaced relation to the bottom member and formed to define a cover-receiving opening,
flange means for connecting the inlet members to the engine to align the inlet openings with the engine exhaust ports,
a stamped sheet metal cover forming an outer exhaust chamber and including a top member formed to include a first exhaust outlet opening, and a perimetrical lip positioned in spaced relation to the top member and inserted into the cover receiving opening to define a split line extending about the perimeter of the exhaust manifold and merge the inner and outer exhaust chambers thereby forming an interior region of the exhaust manifold, the inner and outer shells being configured to define a second exhaust outlet opening therebetween at the split line, and
a plurality of baffles arranged in predetermined fixed positions in the interior region of the exhaust manifold to define a plurality of separate passageways within the exhaust manifold, each passageway connecting a companion engine exhaust port with at least one of the first and second outlets so that the combustion product discharged into the exhaust manifold from each engine exhaust port is isolated in its companion passageway as it is conducted through the housing to permit performance tuning of the engine.

23. The split housing exhaust manifold of claim 22, wherein the perimetrical lip of the base includes a proximal beveled region and a distal side wall, the perimetrical lip of the cover terminates at an edge and is attached to the distal side wall to define a flange-receiving space between the proximal beveled region of the base lip and the edge of a cover lip, and each baffle includes a mounting flange trapped in the flange receiving space so that each baffle is retained in its predetermined position within the exhaust chamber.

24. The split-housing exhaust manifold of claim 22, wherein the base includes a side wall, each baffle includes a tongue section in close proximity to an inlet opening in the bottom member, each tongue section is positioned at a predetermined angle to the split line to form a combustion product-receiving region having a predetermined volume and cross-sectional area in cooperation with the side wall of the base, and the predetermined angles are selected to match the volume and cross-sectional area of the combustion product-receiving regions in accordance with a predetermined specification to performance tune the engine.

25. A method of assembling a split housing exhaust manifold having a plurality of tuning baffles disposed therein, the method comprising the steps of
providing an inner shell formed to include a plurality of inlet openings for communicating with exhaust ports of an engine and a perimetrical lip defining an opening,
placing a portion of each tuning baffle on the perimetrical lip,
positioning each tuning baffle in a predetermined location to isolate each exhaust port of the engine in its own passageway within the exhaust manifold so that the engine is performance tuned,
inserting an outer shell into the opening defined by the perimetrical lip of the inner shell, and
bonding the outer shell to the inner shell at a split line between the inner and outer shells to secure each tuning baffle rigidly in its predetermined position.

26. The method of claim 25, wherein the inner shell includes an interior wall having a plurality of groups of inwardly-extending dimples, and further comprising the step of moving each tuning baffle on the lip to engage a selected group of inwardly extending dimples, thereby defining said predetermined positions.

27. The method of claim 25, further comprising the step of positioning an exhaust tube within a space formed by the inner and outer shells at the split line so that the exhaust tube is secured in the exhaust manifold during the bonding step.

* * * * *